United States Patent Office 3,502,581
Patented Mar. 24, 1970

3,502,581
ANTIOXIDANT COMPOSITION AND
USE THEREOF
Henryk A. Cyba, Evanston, Ill., assignor to Universal
Oil Products Company, Des Plaines, Ill., a corporation of Delaware
No Drawing. Filed Nov. 13, 1967, Ser. No. 682,587
Int. Cl. C10m 1/32, 3/26
U.S. Cl. 252—51.5        10 Claims

ABSTRACT OF THE DISCLOSURE

Antioxidant composition comprising an alkoxyphenyl-alkylaminophenyl or cycloalkylaminophenyl ether or a dialkylaminodiphenyl or dicycloalkylaminodiphenyl ether and a copolymer of a vinyl pyrrolidone and at least one alkylacrylate or at least one alkylmethacrylate. The novel antioxidant composition is particularly suitable for use in the stabilization of lubricants and especially lubricating oil.

DESCRIPTION OF THE INVENTION

This invention relates to a novel antioxidant composition which, as will be hereinafter described in detail, imparts exceptional stability to lubricating oil exposed to oxygen at elevated temperature. This exceptional stability is surprising and appears to be unique for the specific mixtures of the present invention.

In one embodiment, the present invention relates to an antioxidant composition comprising a mixture of a particularly substituted diphenyl ether of the following general formula:

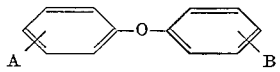

where A is alkoxy or B, and B is sec-alkylamino or cycloalkylamino, and a copolymer of a vinyl pyrrolidone and at least one alkylacrylate or at least one alkylmethacrylate or mixtures thereof.

Where A in the above formula is alkoxy, the alkoxy group preferably contains from one to 4 carbon atoms although it may contain up to 10 carbon atoms. B in the above formula is a sec-alkylamino group containing from 3 to 30 carbon atoms, preferably from 3 to 12 carbon atoms, or cycloalkylamino containing from 3 to 18 carbon atoms, preferably from 4 to 12 carbon atoms in the ring. Particularly preferred compounds for this component of the composition include 4-methoxyphenyl-4'-isopropylaminophenyl ether, 4-methoxyphenyl-4'-sec-butylaminophenyl ether, 4-methoxyphenyl-4'-sec-pentylaminophenyl ether, 4-methoxyphenyl-4'-sec-hexylaminophenyl ether, 4-methoxyphenyl-4'-sec-heptylaminophenyl ether, 4-methoxyphenyl-4'-sec-octylaminophenyl ether, 4-methoxyphenyl - 4' - sec - nonylaminophenyl ether, 4-methoxyphenyl-4'-sec-decylaminophenyl ether, 4-methoxyphenyl-4'-sec-undecylaminophenyl ether, 4-methoxyphenyl-4'-sec-dodecylaminophenyl ether, etc., 4-methoxyphenyl-4'-cyclobutylaminophenyl ether, 4-methoxyphenyl-4'-cyclopentylaminophenyl ether, 4-methoxyphenyl-4'-cyclohexylaminophenyl ether, 4-methoxyphenyl-4'-cycloheptylaminophenyl ether, 4-methoxyphenyl-4'-cyclooctylaminophenyl ether, 4-methoxyphenyl-4'-cyclononylaminophenyl ether, 4-methoxyphenyl-4'-cyclodecylaminophenyl ether, etc., as well as the corresponding 2-methoxy derivatives and 2,4-dimethoxy derivatives. Other compounds in this embodiment include corresponding compounds in which the alkoxy group is ethoxy, propoxy or butoxy and, as hereinbefore set forth, the alkoxy group may contain up to 10 carbon atoms. In still another embodiment the alkoxy and amino groups may be in the positions of 2,4'- or 4,2'-respectively. Especially preferred compounds for this component are 2-methoxyphenyl-4'-isopropylaminophenyl ether, 2-methoxyphenyl-4'-sec-butylaminophenyl ether and 2-methoxyphenyl-4'-cyclohexylaminophenyl ether.

When A in the above formula is the same as B, this component of the composition will be a di-(sec-alkylaminophenyl) ether or di-(cycloalkylaminophenyl) ether. In this embodiment B will have the same definition as hereinbefore set forth. In a preferred embodiment, the substituted amino groups are in the 2,4' positions. Illustrated compounds in this embodiment include 2,4'-di-(isopropylaminophenyl) ether, 2,4'-di-(sec-butylaminophenyl) ether, 2,4'-di-(sec-pentylaminophenyl) ether, 2,4'-di-(sec-hexylaminophenyl) ether, 2,4'-di-(sec-heptylaminophenyl) ether, 2,4'-di-(sec-octylaminophenyl) ether, 2,4'-di-(sec-nonylaminophenyl) ether, 2,4'-di-(sec-decylaminophenyl) ether, 2,4'-di-(sec-undecylaminophenyl) ether, 2,4'-di-(sec-dodecylaminophenyl) ether, etc., 2,4'-di-(cyclobutylaminophenyl) ether, 2,4'-di-(cyclopentylaminophenyl) ether, 2,4'-di-(cyclohexylaminophenyl) ether, 2,4'-di-(cycloheptylaminophenyl) ether, 2,4'-di-(cyclooctylaminophenyl) ether, 2,4'-di-(cyclononylaminophenyl) ether, 2,4'-di-(cyclodecylaminophenyl) ether, etc. In another embodiment, the substituted amino groups are in the 4,4'- positions as illustrated by compounds as 4,4'-di-(isopropylaminophenyl) ether, 4,4'-di-(sec-butylaminophenyl) ether, 4,4'-di-(sec-pentylaminophenyl) ether, 4,4'-di-(sec-hexylaminophenyl) ether, 4,4'-di-(cyclohexylaminophenyl) ether, etc.

Another component of the antioxidant composition of the present invention is a copolymer of a vinyl pyrrolidone and at least one alkylacrylate and/or at least one alkylmethacrylate. The vinyl pyrrolidone is illustrated in the following structure and also is named as pyrrolidinones, 2-oxypyrrolidine or alpha-oxypyrrolidine:

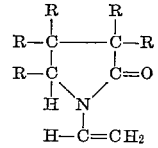

where the R's are hydrogen or the same or different alkyl groups of from one to 6 carbon atoms each. Preferably the vinyl pyrrolidone contains a total of not more than about 10 carbon atoms.

The vinyl pyrrolidone is copolymerized with at least one alkylacrylate and/or alkylmethacrylate, the alkyl groups containing from 1 and preferably from 4 to 30 carbon atoms. In a preferred embodiment, a mixture of alkylacrylates or alkylmethacrylates containing from 10 to 20 carbon atoms in each alkyl is employed. In one embodiment, the alkyl groups correspond to fatty acid derivatives and thus will be selected, for example, from lauryl, myristyl, palmityl and stearyl or mixtures thereof. In another embodiment, the alkyl groups will contain 10 or less carbon atoms and may comprise butyl, pentyl, hexyl, heptyl, octyl, nonyl or decyl. In still another preferred embodiment, a mixture having alkyl groups of 10 or less and alkyl groups of more than 10 carbon atoms is used. The particular alkylacrylates and/or alkylmethacrylates will be selected to form a copolymer product of satisfactory solubility in the substrate.

In preparing the copolymers, the vinyl pyrrolidone is used in a concentration of less than 30% and preferably less than 15% by weight and more particularly in a concentration of from about 5% to about 12% by weight, and the alkylacrylates and/or methacrylates comprising the difference. The copolymerization is effected in any suitable manner and generally by mixing the reactants in the desired proportions and heating to polymerization temperature, preferably in the presence of an initiator.

Any suitable polymerization initiator may be employed and generally will be of the free radical type, including peroxide or azo. A preferred polymerization initiator is benzoyl peroxide. When desired, a solvent may be used and preferably comprises an aromatic solvent including benzene, toluene, xylene, ethylbenzene, cumene or aromatic naphtha. In general, the reaction temperature is within the range of from about 150° to about 300° F.

It is understood that the copolymer also may include minor concentrations of other acids and especially esters including, for example, dialkyl itaconates, dialkyl fumarates, vinyl laurate, vinyl myristate, vinyl palmitate, vinyl stearate, as well as aminoalkyl esters of acrylates or methacrylates such as, for example, dimethylaminoethyl and diethylaminoethyl acrylates or methacrylates. These additional monomers generally will be used in a minor concentration of say less than about 25% by weight of the total reactants and thus will range from about 2% to about 25%.

The particularly substituted diphenyl ether and the copolymer will be mixed to form an antioxidant composition containing from 1 to 10 parts of one component to 1 part of the other component and preferably from about 1 to about 5 parts of one component to about one part of the other component. When desired, the mixture may be prepared in a suitable solvent, in which case the solution may contain from about 10% to about 80% of active ingredients. Any suitable solvent may be employed, which may be aromatic, paraffinic or naphthenic hydrocarbons or mixtures thereof as comprised in various oil fractions. When the antioxidant composition is to be used in a particular substrate, conveniently the antioxidant composition is prepared as a solution in a portion of the substrate and introduced in this manner into the remaining portion of the substrate.

As hereinbefore set forth, the novel antioxidant mixture of the present invention appears to exert an unusual effect in the stabilization of hydrocarbon oil as illustrated by lubricating oil. With the increasing technology in the automotive and aircraft industries, higher temperature and power requirements are indicated. As with all moving parts, these must be lubricated satisfactorily. In turn, this requires lubricating oils of considerably improved properties, in providing satisfactory lubrication at the more severe conditions. Thus the lubricating oil must retain its lubricity properties and not undergo undesirable changes. One method of meeting these severe requirements is by the use of additives in the lubricating oil. Many additives or mixtures of additives have been proposed heretofore and many have proved satisfactory to a more or less degree. However, it appears that most, if not all, of these additives have the disadvantage of permitting undesired changes in the lubricating oil during use.

Surprisingly, it has been found that the novel antioxidant composition of the present invention imparts unique properties to lubricating oil. When evaluated in the presence of oxygen at the high temperature of 400° F., it was found that the used oil remained substantially clean. Normally the evaluation of lubricating oil in the above manner results in the formation of undesirable deposits and corrosion products. As hereinbefore set forth, the novel antioxidant composition of the present invention appears to prevent the formation of these undesired side products to a considerable extent.

Because of the highly unusual results obtained through the use of the novel antioxidant composition of the present invention, it appears that the mechanism of stabilization may be different than from that experienced with other additive compositions. Apparently the improved results of the present composition is due to a synergistic effect obtained through the use of these particular types of components in the antioxidant composition.

The composition of the present invention is being referred to herein as an antioxidant composition. While the composition does retard deterioration due to oxidation, it also serves to stabilize the substrate against other types of deterioration. For example, as will be shown in the following examples, the composition of the present invention also serves to considerably reduce corrosion of metals. Also, when used in lubricating oil, the composition serves as a viscosity index improver, peroxide decomposer, etc., as well as in preventing the formation of sediment and dispersing sediment when formed in lubricating and other oils.

Because of these improved results, the novel antioxidant composition of the present invention is particularly useful in lubricating oils for more severe services. Thus, the antioxidant composition is especially useful in such oils as turbine oils, jet turbine oils, automatic transmission oils, oils for aviation instruments, oils used in automatic weapons, etc. The antioxidant composition obviously can be used to advantage in any lubricating oil, including those used at less severe conditions, as well as in grease.

The lubricating oil may be either synthetically prepared or of petroleum origin. The synthetic lubricating oils are of varied types including aliphatic esters, polyalkylene oxides, silicones, esters of phosphoric and silicic acids, highly fluorine-substituted hydrocarbons, etc. Of the aliphatic esters, di-(2-ethylhexyl) sebacate is being used on a comparatively large commercial scale. Other aliphatic esters include dialkyl azelates, dialkyl suberates, dialkyl adipates, dialkyl glutarates, etc. Specific examples of these esters include dihexyl azelate, di-(2-ethylhexyl) azelate, di-3,5,5-trimethylpentyl glutarate, di-(2-ethylhexyl) pimelate, di-(2-ethylhexyl) adipate, triamyl tricarballylate, pentaerythritol tetracaproate, various other esters of pentaerythritol such as esters of acetic acid, propionic acid, butyric acid, pentanoic acid, hexanoic acid, pimalic acid or mixed esters of these, dipropylene glycol dipelargonate, 1,5-pentanediol-di-(2 - ethylhexanonate), etc. The polyalkylene oxides include polyisopropylene oxide, polyisopropylene oxide diether, polyisopropylene oxide diester, etc. The silicones include methyl silicone, methylphenyl silicone, etc., and the silicates include, for example, tetraisooctyl silicate, etc. The highly fluorinated hydrocarbons include fluorinated oil, perfluorohydrocarbons, etc.

Additional synthetic lubricating oils include (1) neopentyl glycol esters, in which the ester group contains from 3 to 12 carbon atoms or more, and particularly neopentyl glycol propionates, neopentyl glycol butyrates, neopentyl glycol caproates, neopentyl glycol caprylates, neopenty glycol pelargonates, neopentyl glycol pimalates, etc., (2) trimethylol alkanes such as trimethylol ethane, trimethylol propane, trimethylol butane, trimethylol pentane, trimethylol hexane, trimethylol heptane, trimethylol octane, trimethylol nonane, trimethylol decane, trimethylol undecane, trimethylol dodecane, etc., as well as esters thereof and particularly triesters in which the ester portions each contain from 3 to 12 carbon atoms and may be selected from those hereinbefore specifically set forth in connection with the discussion of the neopentylglycol esters, and (3) tricresylphosphate, trioctylphosphate, trinonylphosphate, tridecylphosphate, as well as mixed aryl and alkyl phosphates, etc.

The lubricating oils of petroleum origin include those referred to as motor lubricating oil, railroad type lubricating oil, marine oil, transformer oil, turbine oil, transmission oil, differential oil, diesel lubricating oil, gear oil, cutting oil, rolling oil, cylinder oil, hydraulic oil, slushing oil, specialty products oil, etc.

As hereinbefore set forth the antioxidant composition also may be used in grease. Synthetic greases are made by compositing metallic soaps with synthetic or petroleum lubricating oils. These are metal base synthetic greases and may be further classified as lithium base synthetic grease, sodium base synthetic grease, calcium base synthetic grease, barium base synthetic grease, strontium base synthetic grease, aluminum base synthetic grease, etc. and mixed base greases. These greases are solid or semi-solid gels and, in general, are prepared by the addition to the synthetic lubricating oil of hydrocarbon-soluble metal soaps or salts of higher fatty acids as, for example, lithium stearate, calcium stearate, aluminum naphthenate, etc. The grease may contain thickening agents such as silica, carbon black, talc, organic modified bentonite, etc., polyacrylates, amides, polyamides, aryl ureas, methyl N-n-octadecyl terephthalamate, etc. Another type of grease is prepared from oxidized petroleum wax, to which the saponifiable base is combined with the proper amount of the desired saponifying agent, and the resultant mixture processed to produce a grease. Other types of greases in which the features of the present invention are usable include petroleum grease, whale grease, wool grease, etc., and those made from inedible fats, tallow, butcher's waste, etc.

While the antioxidant composition of the present invention is particularly suitable for use in lubricating oils, it is understood that it also may be used in other hydrocarbon oils including gasoline, naphtha, kerosene, fuel oil, special solvent oils, etc.

The amount of antioxidant composition to be used as an additive will be within the range of from about 0.1% to about 25%. When used in lubricating oil, the concentration of antioxidant composition generally will be within the range of from about 0.5% to about 10% by weight of the lubricating oil.

It is understood that the antioxidant composition of the present invention may be used along with other additives incorporated in the lubricant. For example, a metal deactivator, dye, viscosity index improver, pour point depressant, antifoaming additive, lubricity and extreme pressure additive, antiscuffing additive, etc. may be incorporated in the lubricant. When desired, the antioxidant composition of the present invention may be prepared as a mixture with one or more of these other additives and incorporated in this manner in the lubricant.

The antioxidant composition may be incorporated in the substrate in any suitable manner. In a preferred embodiment the antioxidant composition is pre-prepared, either with or without a solvent, and then incorporated into the substrate. However, when advantages appear therefor, the particularly substituted diphenyl ether and the copolymer may be added separately to the lubricant, preferably with intimate mixing therein. In some cases, the antioxidant composition may be added to the lubricant during the manufacture thereof. For example, when used in grease, the antioxidant composition may be added to one or more of the components before final compositing thereof.

The following examples are introduced to illustrate further the novelty and utility of the present invention but not with the intention of unduly limiting the same.

EXAMPLE I

As hereinbefore set forth, the antioxidant composition of the present invention is surprising in imparting exceptional properties to lubricating oil exposed to oxygen at the high temperature of 400° F. The results of various evaluations are presented in this and the following examples.

The lubricating oil used in this example is dioctyl sebacate, marketed under the trade name of "Plexol 201." The evaluations were made in a modified oxidation stability test in which about 600 ml. of the lubricating oil are contained in a large size test tube maintained at 400° F. by means of an aluminum block heater. In order to evaluate the corrosive properties, metal specimens of 1" square and 1/16" thick are placed in the lubricating oil. The test tube contains an inlet to permit the introduction of air which, in this evaluation, was introduced at the rate of 10 liters of air per hour. The evaluation was continued for 48 hours under these conditions and the results are reported below for various antioxidant compositions of the present invention.

In these tests the important property to be determined is the cleanliness of the oil after being exposed to air at the elevated temperature. The cleanliness was determined by measuring the percent insoluble in isooctane and reported as isooctane insolubles, the amount of total insolubles reported in grams, the change in viscosity of the oil, and the change in weight of the metal specimens due to corrosion. The total insolubles were determined by passing the oil through 5 micron millipore filter and weighing the deposits accumulated on the filter. The loss of metal due to corrosion was determined by weighing the metal specimens before and after the test.

A sample of dioctyl sebacate containing 2% by weight of 4-methoxyphenyl-4'-isopropylaminophenyl ether and 2% by weight of a copolymer product marketed commercially as "Acryloid 866" and stated to be a copolymer of a mixture comprising lauryl and myristyl methacrylates with about 5% by weight of vinyl pyrrolidone. When evaluated in the above manner, the oil had 0.23% by weight isooctane insolubles, 0.0414 grams of total insolubles and change in viscosity of +1.697. It will be noted that the oil containing the additive was extremely clean after evaluation in the above manner. Also of extreme importance is the substantial absence of corrosion of the metal specimens. The copper and silver specimens showed no corrosion at all, there being no increase or decrease in the weight of the specimens. The steel specimen showed an increase of only 0.0004 gram.

While 4-methoxyphenyl-4'-isopropylaminophenyl ether is an effective antioxidant, it does show some deposit formation when evaluated in the above manner. In a comparable evaluation in which the oil contained 2% by weight of this antioxidant (no copolymer product), the oil, after evaluation, contained 0.67% isooctane insolubles, 0.85 gram of total insolubles, and underwent a viscosity change of —4.82%. It will be noted that the isooctane insolubles were decreased by almost two-thirds, the total insolubles were decreased from 0.85 to 0.0414 gram and the viscosity change also was considerably reduced when the mixture of additives was used. The sample containing only the antioxidant produced about 0.002 gram increase in the copper, steel and silver specimens, whereas this was reduced to zero in the case of the copper and silver specimens and down to 0.0004 gram in the steel specimen when using the mixture of additives.

In a similar evaluation using 2% of the copolymer product but no antioxidant, the total insolubles were 0.3776 gram, the viscosity change was +13.95 and the corrosion of copper was —0.0069 gram and of steel was +0.0103. Here again it will be seen that the mixture of additives produced results which were considerably improved over the use of each of the components alone. This is surprising because normally it would be expected that the insolubles and corrosive effects would be the sum of each of the effects. Instead, the use of the mixture resulted in much lower deterioration of the lubricating oil, apparently due to a synergistic effect. As hereinbefore set forth, the low amount of insolubles and the substantial elimination of corrosion indicates that a different mechanism of stabilization may be occuring.

EXAMPLE II

Another series of evaluations was made in substantially the same manner as described in Example I except that 4-methoxyphenyl-4'-cyclohexylaminophenyl ether was used in the additive mixture with another portion of the copolymer product described in Example I. Here again the ether and the copolymer product were each used in a concentration of 2% by weight. When evaluated in the same manner as described in Example I, the dioctyl sebacate analyzed 0.1% by weight of isooctane insolubles, 0.0496 gram of total insolubles and viscosity change of −1.483. The metal specimens showed +0.003 for steel and +0.0004 gram for silver. For comparative purposes, the results of a similar evaluation, in which the dioctyl sebacate contained 2% by weight of 4-methoxyphenyl-4'-cyclohexylaminophenyl ether but no copolymer product, are 1.42% by weight of isooctane insolubles, 0.7360 gram of total insolubles, viscosity change of −4.515% and change in the steel and silver specimens of +0.0028 and +0.0022 gram, respectively.

From the above data, it will be seen that the composition of the present invention served to produce surprisingly improved results.

EXAMPLE III

Another series of evaluations was made in the same manner as described in Example I except that the ether used in this example was 2,4'-di-(sec-butylaminophenyl) ether, the copolymer product being the same. Here again each component was used in a concentration of 2% by weight. When evaluated in this manner, the dioctyl sebacate analyzed 0.1% by weight of isooctane insolubles, 0.0180 gram of total insolubles and viscosity change of only −0.672. The metal specimens showed no change in weight for the steel specimen and only +0.0003 gram and −0.0001 gram for the silver and lead specimens.

For comparative purposes, the results of a similar evaluation in which the dioctyl sebacate contained only 2% of the 2,4'-di-(sec-butylaminophenyl) ether (no copolymer product) analyzed 0.4% by weight isooctane insolubles, 1.0827 grams total insolubles and change in viscosity of 2.57%. Corrosion of the metal strips was +0.0015 grams for the steel specimen, +0.0020 grams for the silver specimen and +0.0019 gram for the lead specimen.

Here again a comparison of the results when using the additive mixture of the present invention with the results obtained when using either component alone (see Example I for the copolymer results) demonstrates the extreme cleanliness effected by using the mixture of the present invention.

EXAMPLE IV

Still another series of evaluations was made in the same manner as described in Example I using a mixture of 2,4'-di-(sec-butylaminophenyl) ether and a copolymer product prepared in substantially the same manner as described in Example I except that the vinyl pyrrolidone was used in a concentration of about 10%. Here again each component of the mixture was used in a concentration of 2% by weight of the dioctyl sebacate lubricating oil. When evaluated in the same manner as described in Example I, the oil analyzed 0.04% isooctane insolubles, 0.0462 gram total insolubles and a viscosity change of only −0.652%. The metal specimens showed −0.0005 gram for the steel specimen and −0.0001 gram for the silver specimen. Here again the improved results obtained when using the mixture of the present invention are demonstrated.

EXAMPLE V

Another series of evaluations were made according to the L-38 engine test. In this test a CLR single engine is used and the test is run at an engine speed of 3150 r.p.m., an engine load of 30 b.hp., a jacket outlet temperature of 210° F., a jacket inlet temperature of 190° F., an oil temperature of 300° F. and an air to fuel ratio of 14.5:1. Isooctane plus 3 cc. of tetraethyl lead and solvent refined oil of S.A.E. 30 type lubricating oil are used. Each run is continued for 80 hours.

When evaluated in the above manner, a control sample of dioctyl sebacate (not containing additives) underwent a bearing loss of about 408 mg. and an increase is viscosity at 100° F. from 68.7 to about 129 S.S.U. after only 20 hours. The neutralization number of the dioctyl sebacate after 20 hours increased from 0.03 to about 33 meq./g.

In another evaluation in which the dioctyl sebacate contained 1% by weight of 4-methyoxyphenyl-4'-isopropylaminophenyl ether and 5% by weight of "Acryloid 866," described in Example I, the bearing weight loss was only 22.4 mg. after 40 hours and 59.3 mg. after 80 hours. This is in contrast to the loss of about 408 mg. for the control sample as described above. The viscosity at 100° F. of the used oil was 114 originally and 100.5 S.S.U. after 40 hours and 101.9 after 80 hours. The neutralization number increased from 0.02 to only 0.38 after 40 hours and to 0.45 meq./g. after 80 hours. These data again demonstrate the extreme cleanliness of the oil containing the additive composition of the present invention.

EXAMPLE VI

Another evaluation was made in the same manner as described in Example V except that the dioctyl sebacate contained 1% by weight of 4-methoxyphenyl-4'-cyclohexylaminophenyl ether and 5% by weight of "Acryloid 866." The bearing weight loss after 40 hours was only 27 mg. and 42.6 mg. after 80 hours. This is in contrast to the loss of about 408 mg. for the control sample of the dioctyl sebacate after only about 18 hours. The viscosity of the oil containing the additive composition changed from 115 to 101.2 after 40 hours and to 99.9 S.S.U. at 100° F. after 80 hours.

EXAMPLE VII

Similar results to those reported in Exampe VI were obtained when the dioctyl sebacate contained 1% by weight of 2,4'-di-(sec-butylaminophenyl) ether and 5% by weight of "Acryloid 866." The bearing weight loss after evaluation in the L-38 engine test was only 27.5 mg. after 40 hours and 32.7 mg. after 80 hours. The viscosity at 100° F. changed from 115.3 originally to 101.1 after 40 hours and 99.6 S.S.U. after 80 hours.

EXAMPLE VIII

The additive composition of this example comprises a mixture of 60% by weight of 2-propoxyphenyl-4'-sec-butylaminophenyl ether and 40% by weight of a copolymer product formed by the copolymerization of 70 parts by weight of alkyl methacrylates in which the alkyl portion is derived from a commercial fraction of $C_{12}$ to $C_{18}$ fatty alcohols, 20 parts of butylacrylate and 10 parts of vinyl pyrrolidone.

The above additive composition is used in a concentration of 3% by weight in turbine oil and serves to stabilize the oil against deterioration during storage, transportation and use.

EXAMPLE IX

The additive of this example comprises 40% by weight of 4,4'-di-(cyclohexylaminophenyl) ether and 60% by weight of a copolymer prepared from a mixture of 40 parts stearyl methacrylate, 40 parts of a mixture of lauryl and myristyl methacrylates, 10 parts n-butyl methacrylate, 4 parts dimethylaminoethyl methacrylate and 6 parts vinyl pyrrolidone.

The above additive composition is used in a concentration of 0.03% as an additive in unstable fuel oil and serves to stabilize the fuel oil against deterioration in storage and transportation.

EXAMPLE X

The antioxidant composition prepared as described in Example II is used as an additive in lithium base grease. The antioxidant composition is incorporated in a concentration of 0.4% by weight in lubricating oil and the lubricating oil then is mixed with approximately 8% by weight of lithium stearate. The mixture is heated to about 450° F. with constant agitation. Subsequently the grease is cooled, while agitating, to approximately 250° F. and then is further cooled slowly to room temperature.

When evaluated in a bomb charged with oxygen at a temperature of 250° F., the Induction Period is determined as the time required for a drop of 5 pounds pressure to occur. The synergistic mixture serves to increase the Induction Period of the grease from 7 hours to over 225 hours.

I claim as my invention:

1. Antioxidant composition of a diphenyl ether component as hereinafter defined and a polymer component, said composition containing from 1 to 10 parts of one component to 1 part of the other component, said polymer being selected from the group consisting of
   (1) copolymer of a vinyl pyrrolidone and an alkylacrylate or mixture of alkylacrylates in which the alkyl groups correspond to fatty acid derivatives;
   (2) copolymer of a vinyl pyrrolidone and an alkylmethacrylate or mixture of alkylmethacrylates in which the alkyl groups correspond to fatty acid derivatives; and
   (3) polymers as defined in (1) or (2) also including as a reactant from about 2% to about 25% by weight, based on total reactants, of a di-lower alkylamino-lower alkyl acrylate or methacrylate;

and said diphenyl ether having the formula

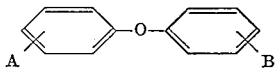

where A is alkoxy of from 1 to 4 carbon atoms or B, and B is sec-alkylamino containing from 3 to 12 carbon atoms.

2. The composition of claim 1 in which the polymer is as defined in paragraph (3) of claim 1.

3. The composition of claim 1 in which said fatty acid derivatives are derived from the class consisting of stearic, lauric and myristic acids.

4. The composition of claim 1 containing from 1 to 5 parts of said one component to 1 part of said other component.

5. The composition of claim 1 in which said diphenyl ether is a 4-methoxy-4'-sec-alkylaminophenyl ether in which the sec-alkylamino group contains from 3 to 12 carbon atoms.

6. The composition of claim 1 in which said diphenyl ether is a 2,4'-di-sec-alkylaminodiphenyl ether in which the sec-alkylamino groups each contain from 3 to 12 carbon atoms.

7. The composition of claim 1 used as an additive in an organic substrate subject to oxidative deterioration.

8. The composition of claim 7 in which said organic substrate is lubricating oil.

9. The composition of claim 8 in which said lubricating oil is synthetic lubricating oil.

10. The composition of claim 8 in which said lubricating oil is petroleum lubricating oil.

References Cited

UNITED STATES PATENTS

| 3,093,586 | 6/1963 | Cyba | 252—51.5 |
| 3,147,222 | 9/1964 | Bauer. | |
| 3,208,944 | 9/1965 | Cyba | 252—51.5 |
| 3,372,120 | 3/1968 | Coleman. | |

DANIEL E. WYMAN, Primary Examiner

W. J. SHINE, Assistant Examiner

U.S. Cl. X.R.

44—62, 75; 252—392, 403